(12) United States Patent  
Tanaka

(10) Patent No.: US 7,486,412 B2
(45) Date of Patent: Feb. 3, 2009

(54) PRINTING SERVICE SYSTEM

(75) Inventor: Keisuke Tanaka, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 724 days.

(21) Appl. No.: 10/669,609

(22) Filed: Sep. 25, 2003

(65) Prior Publication Data

US 2004/0061900 A1   Apr. 1, 2004

(30) Foreign Application Priority Data

Sep. 27, 2002  (JP) ............................ 2002-284133
Mar. 24, 2003  (JP) ............................ 2003-079580

(51) Int. Cl.
*G06F 15/00* (2006.01)
(52) U.S. Cl. ........................ 358/1.18; 358/1.2; 382/284
(58) Field of Classification Search ................ 358/1.2, 358/1.15, 1.18, 448, 453; 382/284
See application file for complete search history.

(56) References Cited

U.S. PATENT DOCUMENTS

| | | | | |
|---|---|---|---|---|
| 4,827,349 | A * | 5/1989 | Ogata et al. ................. | 358/434 |
| 6,324,521 | B1 | 11/2001 | Shiota et al. | |
| 6,587,596 | B1 * | 7/2003 | Haeberli ..................... | 382/283 |
| 2001/0027454 | A1 | 10/2001 | Tsue | |
| 2002/0013742 | A1 | 1/2002 | Shiota et al. | |

FOREIGN PATENT DOCUMENTS

| | | |
|---|---|---|
| JP | 11184594 | 7/1999 |
| JP | 2002010061 | 1/2002 |
| JP | 2002074087 | 3/2002 |
| JP | 2002196431 | 7/2002 |

OTHER PUBLICATIONS

Sheldon, Tom, McGraw-Hill Encyclopedia of Networking and Telecommunications, 2001, pp. 1192-1203.

* cited by examiner

*Primary Examiner*—Kimberly A Williams
(74) *Attorney, Agent, or Firm*—Birch, Stewart, Kolasch and Birch, LLP

(57) ABSTRACT

Finish of a composite image generated from an image and characters can be confirmed by enlarging the characters alone and without enlarging a copyrighted image such as a cartoon character. In order to generate the composite image, the characters are input from a user terminal according to a template. In a printing service apparatus, image data of the composite image are generated and sent to the user terminal. By an instruction from the user terminal, enlargement data are generated for enlarging the characters alone and sent to the user terminal.

8 Claims, 7 Drawing Sheets

FIG.4

ADDRESSEE INFORMATION ENLARGEMENT

A #303 798-56 MIYADAI KAISEI-CHO
KANAGAWA-KEN, 258-8538 JAPAN

TARO FUJI, HANAKO FUJI
ICHIRO FUJI (6 YEARS OLD)
JIRO FUJI (2 YEARS OLD)
TEL(0465)85-2128/PHS(070)8953-2525
E-mail taro@e-mail.ne.jp/hanako@e-mail.ne.jp 224  (CLOSE)

FIG.5

GREETING ENLARGEMENT

HAPPY NEW YEAR 223  (CLOSE)

FIG.8

PRINTING SERVICE SYSTEM

This nonprovisional application claims priority under 35 U.S.C. § 119(a) on Patent Application Nos. 2002-284133 and 2003-079580 filed in Japan on Sep. 27, 2002 and Mar. 24, 2003, which are herein incorporated by reference.

BACKGROUND OF THE INVENTION

1. Field of the Invention

The present invention relates to a printing service using a network.

2. Description of the Related Art

Following the spread of the Internet recently, service systems are being provided for generating a postcard or the like by printing a composite image generated from characters and an image provided on the Web. In such a system, the characters representing an address or a greeting are input by a user from his/her terminal, and combined with the image provided on the Web for generating the composite image.

Such a composite image may be generated from a user image and a template, and how the composite image looks can be confirmed in advance in some cases (see U.S. Pat. Laid-Open No. 20010027454.

When a postcard or the like is generated by printing a composite image generated from an image and characters combined together according to a template, characters in the postcard may be different from the characters that a user has input. This case is observed if Japanese character conversion programs (programs used by front-end processors or the like) are different between a personal computer of the user and a server. If the programs are not the same, a character code displayed normally on the personal computer of the user (such as a character in the JIS (Japan Industrial Standard) level-3 kanji set or an external character registered by the user) is printed as a different character on the postcard. Furthermore, the user may make a mistake upon input of the characters. In this case, the composite image is printed as a postcard having the wrong characters printed thereon if the user does not realize the mistake.

These problems are hard to avoid because the composite image displayed on the Web has a low resolution so that the characters cannot be confirmed clearly in the composite image. If a high-resolution image is displayed in order to avoid these problems, the characters are easy to confirm, since the image is not degraded even if the image is enlarged. However, content to be protected by copyright, such as a cartoon character, can also be enlarged without degradation of the quality, which may lead to illegal use of the content. Therefore, a high-resolution image that enables enlargement of the content cannot be displayed.

SUMMARY OF THE INVENTION

The present invention has been conceived based on consideration of the above circumstances. An object of the present invention is therefore to provide a system that enables confirmation of a character input by a user without enlarging a copyrighted image such as a cartoon character.

A printing service system of the present invention comprises a printing service apparatus for providing a service of printing a composite image generated from an image and characters, and a user terminal connected to the printing service apparatus via a network for using the printing service. The printing service apparatus comprises template storage means for storing templates used for generating the composite image and template sending means for reading one of the templates from the template storage means according to a template transfer request from the user terminal and for sending the template to the user terminal. The user terminal comprises character input means for inputting the characters to be used for generating the composite image according to the template sent thereto, and for sending the characters to the printing service apparatus. The printing service apparatus further comprises composite image generation means for generating the composite image from the characters received from the user terminal and the image according to the template, and image data sending means for generating data of the composite image and for sending the composite image data to the user terminal. The printing service system is characterized by that the printing service apparatus comprises instruction page data sending means for generating data of an instruction page for enabling the user terminal to specify enlargement of the characters input from the user terminal and for sending the enlargement data to the user terminal, and enlargement sending means for generating enlargement data of the characters specified by the user terminal and for sending the enlargement data to the user terminal.

The printing service apparatus refers to a server computer that has a function of a Web server, and enables provision of the service via the network such as the Internet.

The user terminal refers to a computer such as a personal computer or a mobile terminal, and has a function of Web browser or the like for using the service provided by the server computer via the network.

The network refers to the Internet, an intranet, a LAN (local Area Network), a WAN (Wide Area Network), or a point-to-point connection, for example.

The composite image refers to combination of an image with characters, such as a postcard or a greeting card. The data of the composite image refer to data of the composite image that enable confirmation of the finish of the composite image on the user terminal.

The templates respectively have a predetermined format wherein an insertion area and a size for the image or the characters are defined. The composite image is generated by inserting the image and the characters according to any one of the templates. The templates may have an image such as a cartoon character therein.

The instruction page refers to a page wherein the specification can be made with use of a pointing device such as a mouse or a keyboard, according to a button and an area in the page. The instruction page data refer to data of the button and the area to be used for specification.

The composite image generation means of the printing service apparatus may have a Japanese character conversion program for converting a character code into a Japanese character so that the Japanese character conversion program can convert character codes received from the user terminal into the characters to be used for composite image generation.

The Japanese character conversion program is a program for converting a character code determined according to JIS or ASCII into a character to be printed by a printing apparatus or displayed on a display apparatus. Converting a character code into a Japanese character by the Japanese character conversion program refers to conversion of a character code determined by JIS or ASCII into a Japanese character in a font such as Mincho or Gothic, for example.

A printing service apparatus of the present invention is an apparatus connected via a network to a user terminal for using a service of printing a composite image generated from an image and characters, and the printing service apparatus comprises:

template storage means for storing templates used for generating the composite image;

template sending means for reading one of the templates from the template storage means according to a template transfer request from the user terminal and for sending the template to the user terminal;

composite image generation means for receiving the characters input from the user terminal to be used for generating the composite image, and for generating the composite image from the characters and the image according to the template;

image data sending means for generating image data representing the composite image generated by the composite image generation means and for sending the image data to the user terminal. The printing service apparatus is characterized by that the printing service apparatus further comprises instruction page data sending means for generating data of an instruction page that enables the user terminal to specify enlargement of the characters input from the user terminal and for sending the data to the user terminal, and enlargement sending means for generating enlargement data representing the characters whose enlargement was specified by the user terminal and for sending the enlargement data to the user terminal.

According to the printing service system of the present invention, the composite image generated from the image and the characters according to the template can be confirmed on the user terminal, and only the characters can be enlarged. Therefore, even if the template includes copyrighted content such as a cartoon character, only the characters can be confirmed by being enlarged.

Furthermore, whether or not the characters to be used for composite image generation have been converted into wrong characters due to a difference in Japanese character conversion programs can also be confirmed.

BRIEF DESCRIPTION OF THE DRAWINGS

FIG. 4 is a page for enlarging an address;

FIG. 5 is a page for enlarging a greeting;

FIG. 8 is a form for inputting an address.

DESCRIPTION OF THE PREFERRED EMBODIMENT

Figure 1:
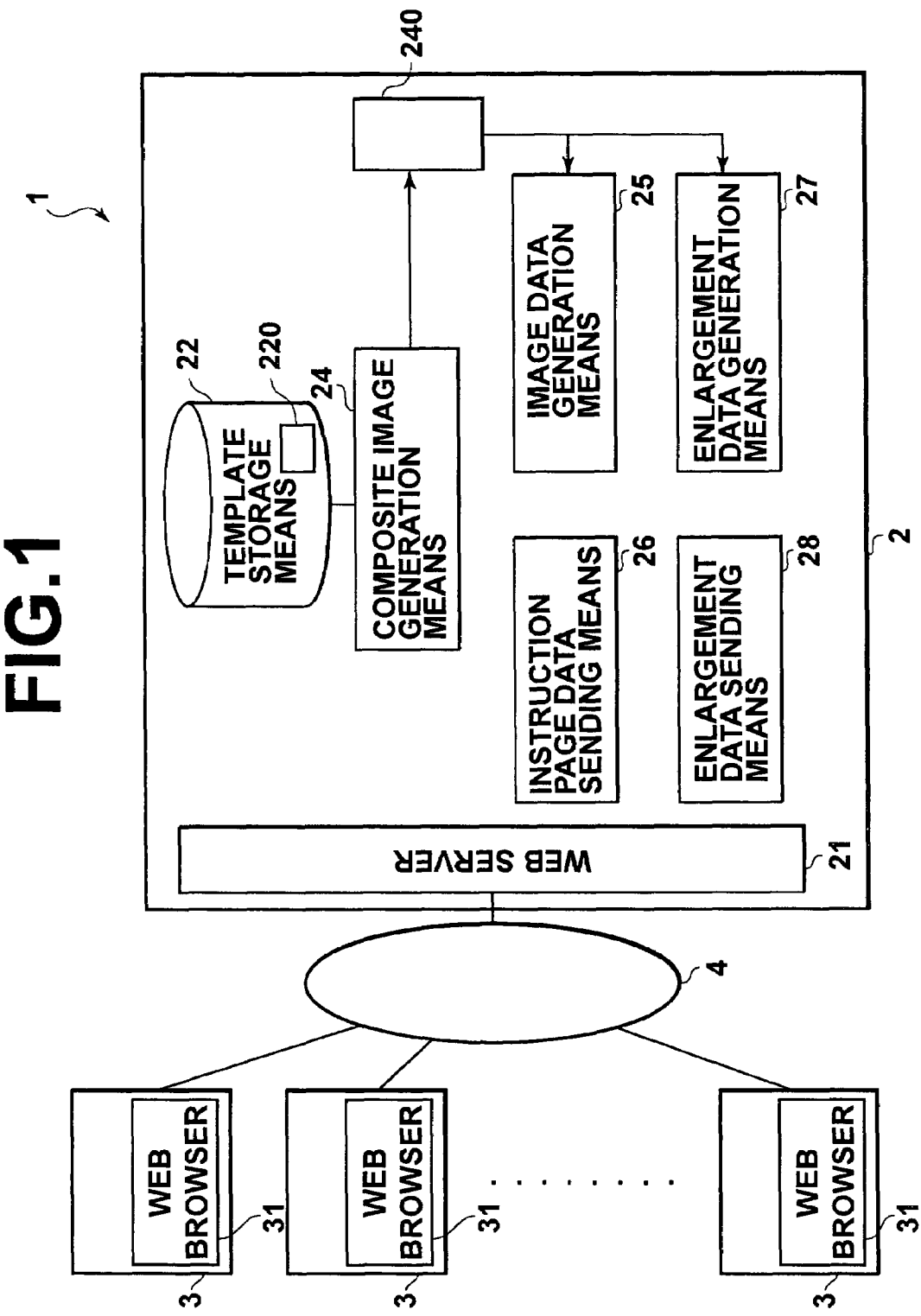
FIG. 1 is a block diagram showing the configuration of a printing service system.

Hereinafter, an embodiment of a printing service system of the present invention will be explained with reference to the accompanying drawings. FIG. 1 is a block diagram showing the configuration of the printing service system. As shown in FIG. 1, a printing service system 1 comprises a printing service apparatus 2 for providing a service of printing a composite image, and a user terminal 3 for using the printing service. The printing service apparatus 2 and the user terminal 3 are connected to each other via a network 4.

The printing service apparatus 2 is a server computer having Web server software 21, and provides the printing service to a user via the network 4 such as the Internet. The printing service apparatus 2 comprises template storage means 22 for storing templates 220 used for generating a composite image 240 from an image and characters, composite image generation means 24 for generating the composite image 240 from the characters and the image input from the user terminal 3 according to one of the templates 220, image data generation means 25 for generating image data used for confirmation of the composite image 240 on the user terminal 3, instruction page data sending means 26 for enabling the user to enlarge the characters in the image data by using the user terminal 3, enlargement generation means 27 for generating an enlargement of the characters, and enlargement sending means 28 for sending the enlargement to the user terminal 3.

The user terminal 3 is a personal computer or a mobile terminal that has browser software such as Web browser 31 installed therein, and enables the user to use the printing service via the network 4 while confirming a screen displayed on a display device thereof. The user terminal 3 comprises character input means for generating the composite image 240 according to the selected template 220 by accessing the printing service apparatus 2, and for inputting and sending the characters and the image to be used for generating the composite image 240 to the printing service apparatus 2.

The printing service apparatus 2 and the user terminal 3 respectively have a Japanese character conversion program as a front-end processor or the like.

Figure 2:
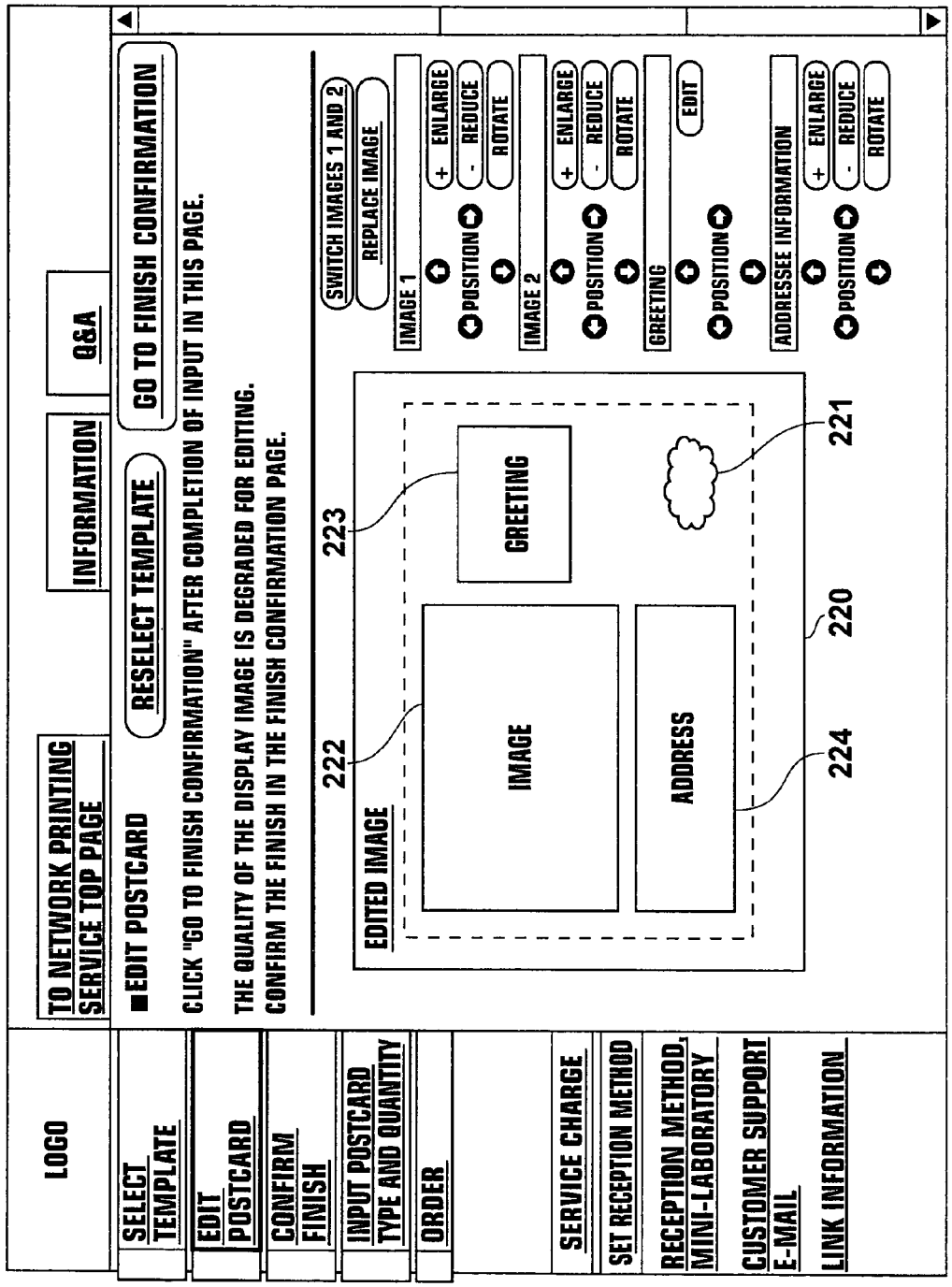
FIG. 2 is a page for explaining how a template is used.

Each of the templates 220 has a setting of a position and a frame in which the image and the characters to be used for generating the composite image 240 are inserted, as shown in FIG. 2. Each of the templates 220 has an image insertion area 222, and character input areas 223 and 224. Image data representing the image uploaded from the user terminal 3 or selected from pre-provided content may be inserted in the image insertion area 222. In addition, some of the templates 220 include an image 221 such as a cartoon character inserted therein in advance.

The composite image generation means 24 generates the composite image 240 by inserting the characters input from the user terminal 3 and the image data in the template 220 selected by the user with use of the user terminal 3. The characters input from the user terminal 3 are received in the form of character codes (such as JIS code or ASCII code), and the character codes are converted into the characters of a specified format (of a specified font, style, and size, for example). The characters converted in this manner are then used for generating the composite image 240. Therefore, although the character codes are used in the Japanese character conversion program of the user terminal 3, the character codes may not be converted properly if the character codes are not used in the printing service apparatus 2. More specifically, the characters are not converted properly in the case where the printing service apparatus 2 does not deal with characters in the JIS level-3 kanji set while the user terminal does, or in the case where the characters have been registered as external characters only with the user terminal 3.

Figure 3:
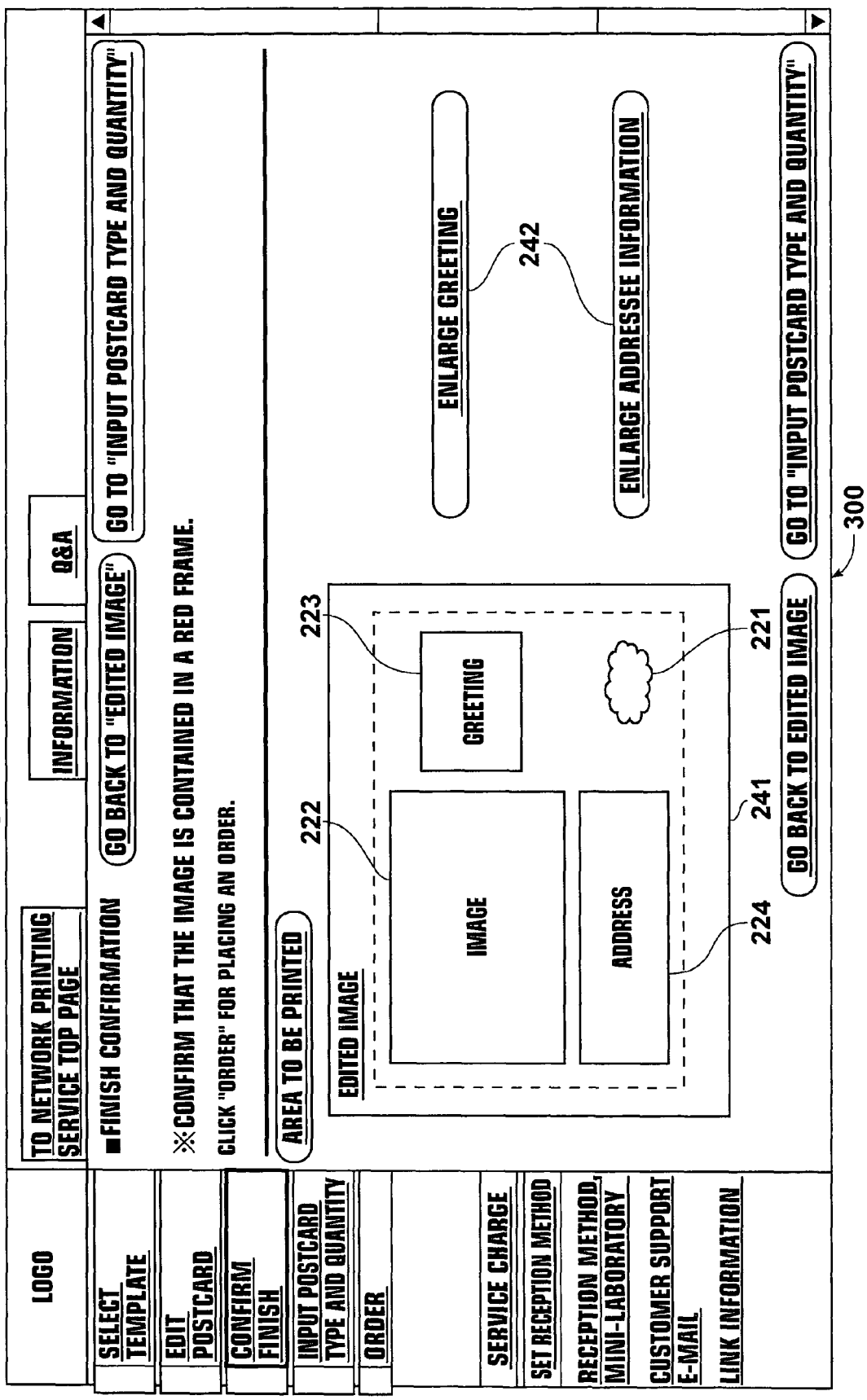
FIG. 3 is a page for confirming the finish of a composite image.

The image data generation means 25 converts the composite image 240 into image data 241 (of the format such as GIF, JPEG, or bitmap), and generates a finish confirmation page 300 having the image data 241 therein for enabling the user to confirm the composite image 240 on the user terminal 3. FIG. 3 shows an example of the finish confirmation page 300 having the image data 241 comprising the image data inserted in the image insertion area 222 and the characters input in the character input areas 223 and 224. In the case where the selected template 220 has the image 221 such as a cartoon character, the image 221 is also used for generating the composite image 240.

When the finish confirmation page 300 is sent to the user terminal 3, it is preferable for the image data 241 to have a low resolution for fast display of the finish confirmation page 300.

In the case where the selected template 200 has the image 221, enlargement of the image 221 on the user terminal 3 becomes possible if the image data 241 has a high resolution. Therefore, the image 221 may be used illegally with use of capture software or the like. For this reason, it is preferable for the image data 241 to have the low resolution that only enables confirmation of the composite image 240. However, if the resolution is low, the characters input by the user may not be confirmed in detail in some cases.

In order to solve this problem, the instruction page data sending means 26 sends to the user terminal 3 the finish confirmation page 300 that enables enlargement of only the characters in the character input areas 223 and 224. More specifically, as shown in FIG. 3, the finish confirmation page 300 has buttons 242 for specification of which characters are to be enlarged. Alternatively, the finish confirmation page 300 may enable the user to specify the characters to be enlarged in the character input areas 223 and 224, with use of a pointing device such as a mouse.

When the user specifies enlargement of the characters by using the buttons 242 or the like, the enlargement generation means 27 generates the enlargement of the characters in the character input areas 223 and 224 in the composite image 240. FIGS. 4 and 5 show examples of how the enlargement looks. When the enlargement is generated, the background and a color thereof may be fixed. However, since the areas for inputting greeting and addressee information are predetermined, an image representing the character input areas may be prepared so that the characters can be inserted in the image. In this manner, the characters are displayed for confirmation thereof, in the same manner as in the composite image 240 to be printed. In addition, the color specified by the user may preferably be used.

The enlargement data sending means 28 receives the enlargement specification regarding the character input areas 223 and 224 from the user terminal 3, and sends the enlargements (shown in FIGS. 4 and 5) generated by the enlargement generation means 27 to the user terminal 3. The enlargements may be displayed in a window separate from the finish confirmation page 300.

Figure 6:
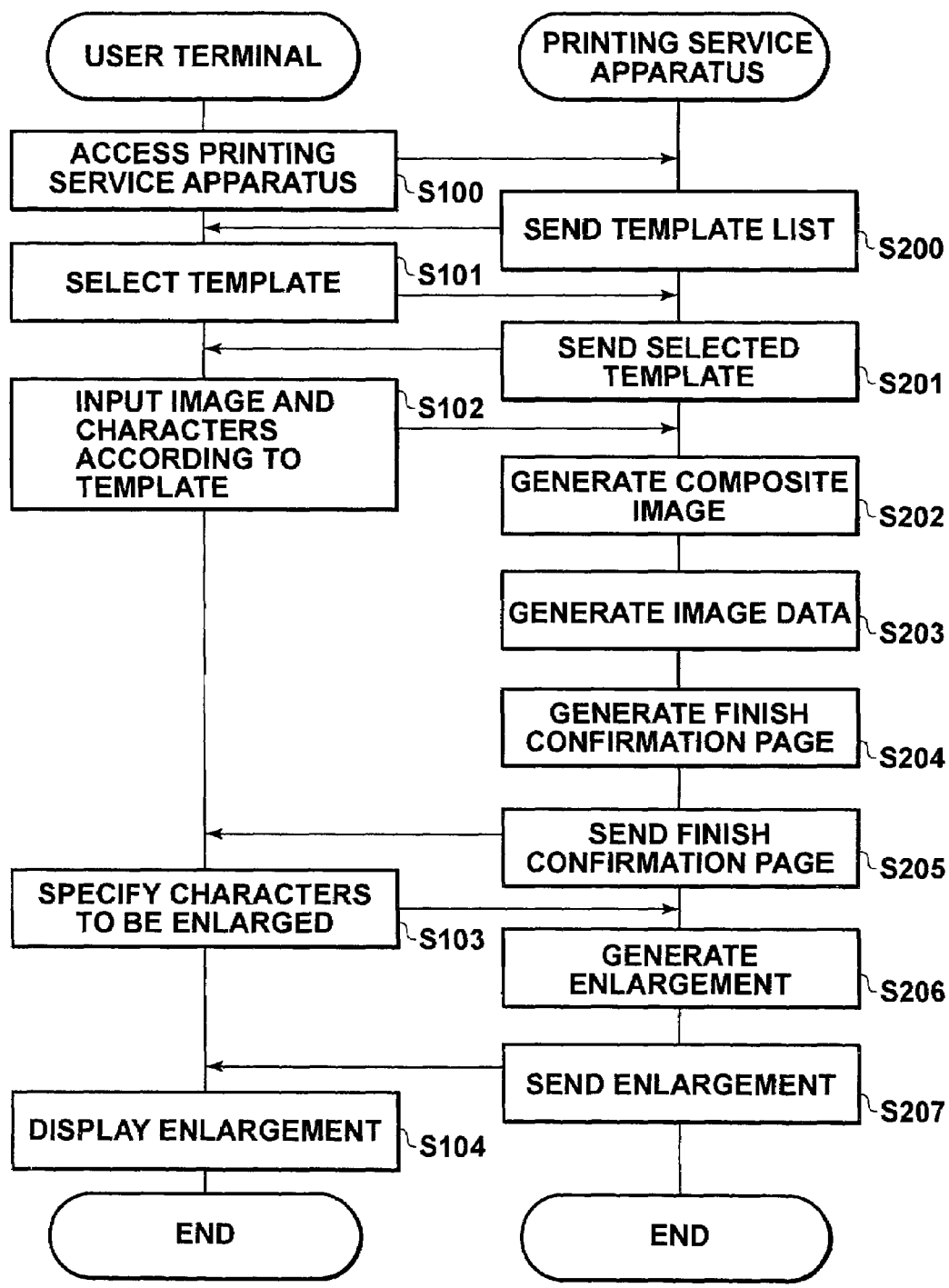
FIG. 6 is a flow chart showing the operation of the printing service system.

The operation of the printing service system 1 will be explained with reference to the flow chart shown in FIG. 6.

The user accesses the printing service apparatus 2 from the user terminal 3 (Step S100), and the printing service apparatus 2 sends a list of the templates 220 to the user terminal 3 (Step S200). The list is displayed on the user terminal 3. The user selects one of the templates 220 to be used for generating the composite image 240 from the list by using the user terminal 3 (S101), and the printing service apparatus 2 sends the selected template 220 by reading the template from the template storage means 22 (Step S201). At this time, the pre-provided content such as the image data to be used for composite image generation may also be sent.

Figure 7:
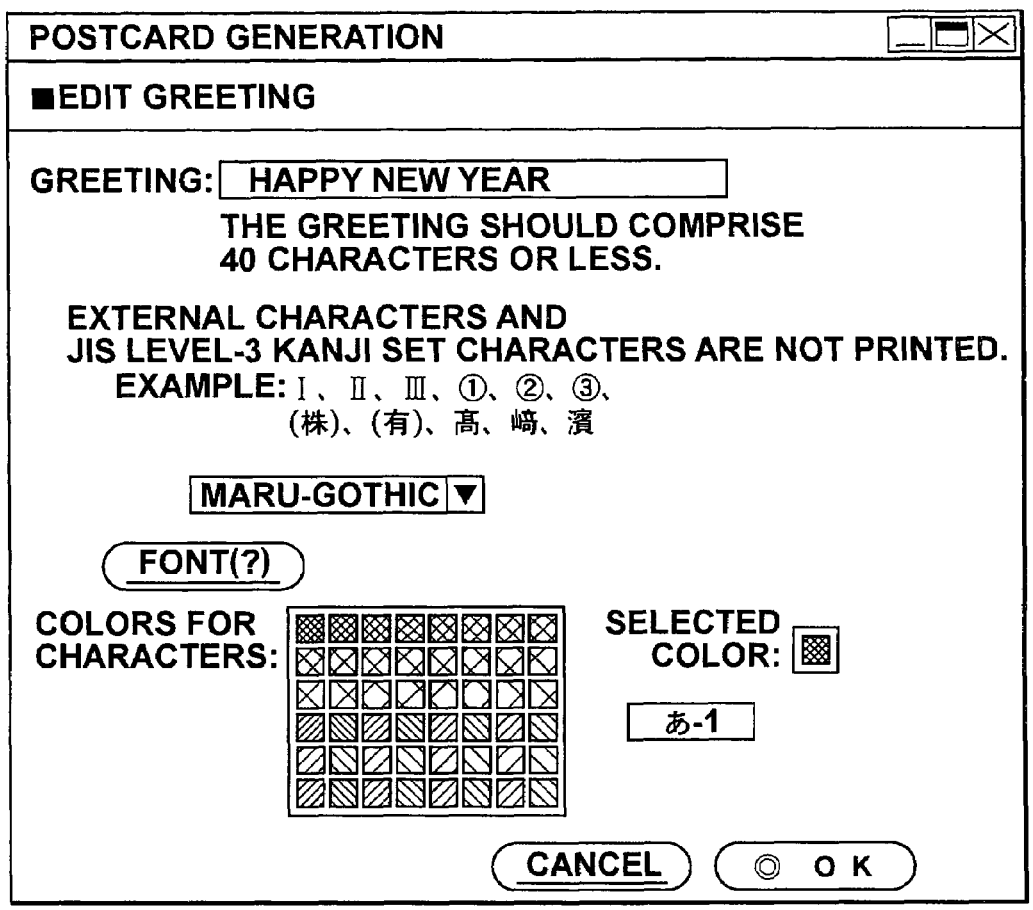
FIG. 7 is a form for inputting a greeting.
Figure 8:
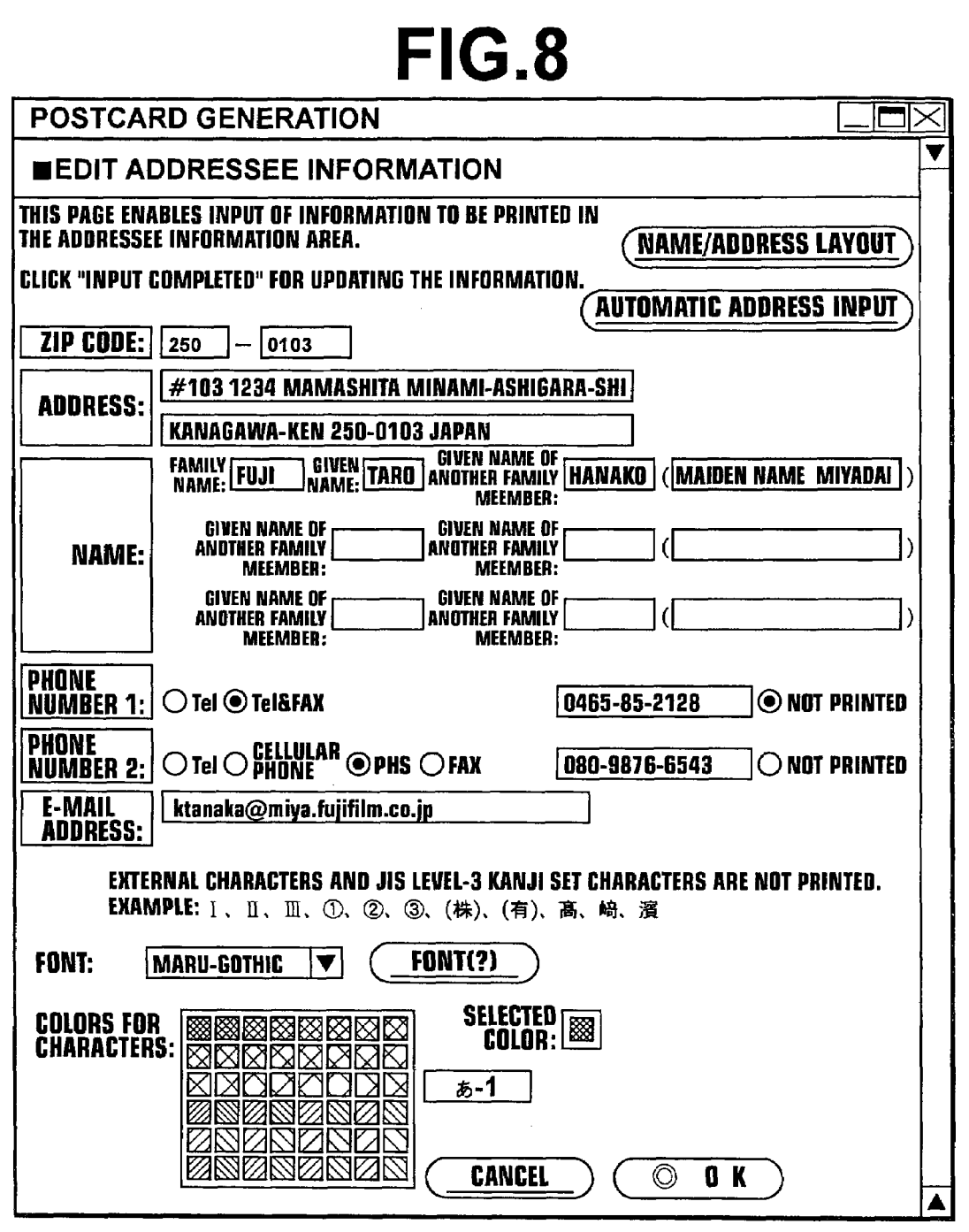

The template 220 and the content are displayed on the user terminal 3, and the user uploads the image data (obtained by a digital camera, for example) to be inserted in the image insertion area 222 to the printing service apparatus 2 according to the selected template 220 (shown in FIG. 2). Alternatively, the image data to be inserted may be selected from the pre-provided content sent to the user terminal 3. The user further inputs the characters such as the greeting and the addressee information in the character input areas 223 and 224. For example, the greeting and the addressee information are input according to forms shown in FIGS. 7 and 8, and the user also specifies the color and the format of the characters (Step S102).

The printing service apparatus 2 receives the image data and the characters selected and input by the user from the user terminal 3, and the composite image generation means 24 generates the composite image 240 including the image data and the characters. The characters input by the user from the user terminal 3 are received in the form of the character codes, and converted according to the Japanese character conversion program in the specified format in the composite image 240 (Step S202).

The image data generation means 25 generates the image data 241 of the composite image 240 for enabling the user to confirm the composite image 240 by using the user terminal 3 (Step S203). The instruction page data sending means 26 generates the finish confirmation page 300 having the buttons 242 for specifying enlargement of the characters (Step S204), and sends the finish confirmation page 300 to the user terminal 3 (Step S205).

The user terminal 3 receives the image data 241, and the user confirms the composite image 240 on the user terminal 3. In the case where the user wishes to enlarge the characters in the character input areas 223 and 224, the user specifies the characters in the finish confirmation page 300 (Step S103). In the printing service apparatus 2, the enlargement generation means 27 generates the enlargement of the characters in the character input areas as shown in FIGS. 4 and 5 (Step S206), and the enlargement data sending means 28 sends the enlargement to the user terminal 3 (Step S207). The enlargement is displayed on the user terminal 3 for character confirmation (Step S104). FIG. 4 shows the enlargement of the addressee information in the character input area 224, and FIG. 5 shows the enlargement of the greeting in the character input area 223. By enlarging the characters, presence or absence of garbled characters therein or a mistake in the input of the characters can be confirmed.

As has been described above, by enlarging the characters alone, the characters can be confirmed in detail without enlargement of a portion such as the cartoon character whose enlargement is not desired.

What is claimed is:

1. A printing service system comprising a printing service apparatus for providing a service of printing a composite image generated from an image and characters, and a user terminal connected to the printing service apparatus via a network for using the printing service, the printing service apparatus comprising template storage means for storing templates used for generating the composite image and template sending means for reading one of the templates from the template storage means according to a template transfer request from the user terminal and for sending the template to the user terminal, the user terminal comprising character input means for inputting the characters to be used for generating the composite image according to the template sent thereto, and for sending the characters to the printing service apparatus, the printing service apparatus further comprising composite image generation means for generating the composite image from the characters received from the user terminal and the image according to the template, wherein the composite image generated by said generation means is the composite image used for printing, and image data sending means for generating composite image data and sending the composite image data to the user terminal, where the resolution of the composite image data is lower than that of the composite image, wherein the printing service apparatus further comprises:

instruction page data sending means for sending, to the user terminal, data of an instruction page for enabling the user terminal to specify enlargement of only the characters in the composite image, and enlargement sending means for generating enlargement data of the characters specified by the user terminal and for sending the enlargement data to the user terminal.

2. The printing service system according to claim 1, wherein
the character input means of the user terminal sends the characters in the form of character codes to the printing service apparatus and
the composite image generation means of the printing service apparatus has a Japanese character conversion program for converting the character codes received from the user terminal into the characters to be used for generation of the composite image.

3. A printing service apparatus connected via a network to a user terminal for using a service of printing a composite image generated from an image and characters, the printing service apparatus comprising:
template storage means for storing templates used for generating the composite image;
template sending means for reading one of the templates from the template storage means according to a template transfer request from the user terminal and for sending the template to the user terminal;
composite image generation means for receiving the characters input from the user terminal to be used for generating the composite image and for generating the composite image from the characters and the image according to the template, where the composite image generated by said generation means is the composite image used for printing;
image data sending means for generating composite image data representing the composite image generated by the composite image generation means and for sending the composite image data to the user terminal, where the resolution of the composite image data is lower than the resolution of the composite image, wherein
the printing service apparatus further comprises:
instruction page data sending means for sending, to the user terminal, data of an instruction page that enables the user terminal to specify enlargement of only the characters in the composite image; and
enlargement sending means for generating enlargement data representing the characters whose enlargement was specified by the user terminal and for sending the enlargement data to the user terminal.

4. The printing service apparatus according to claim 3, the composite image generation means having a Japanese character conversion program for converting character codes into characters, whereby
the composite image generation means receives the characters input from the user terminal in the form of character codes, and converts the character codes into the characters to be used for generation of the composite image according to the Japanese character conversion program.

5. A method for providing a service of printing a composite image generated from an image and characters, said method comprising:
storing templates used for generating the composite image;
reading one of the stored templates according to a template transfer request received from a user terminal via a network;
sending the template from a printing service apparatus to the user terminal via the network, the user terminal inputting the characters to be used for generating the composite image according to the template sent thereto and sending the characters to the printing service apparatus;
generating the composite image from the characters received from the user terminal and the image according to the template, where the composite image so generated is the composite image used for printing;
generating composite image data and sending the composite image data to the user terminal, where the resolution of the composite image data is lower than that of the composite image;
sending, to the user terminal, data of an instruction page for enabling the user terminal to specify enlargement of only the characters in the composite image; and
generating enlargement data of the characters specified by the user terminal and sending the enlargement data to the user terminal.

6. The method according to claim 5, wherein
the user terminal sends the characters in the form of character codes to the printing service apparatus; and
the printing service apparatus has a Japanese character conversion program for converting the character codes received from the user terminal into the characters to be used for generation of the composite image.

7. The method according to claim 5, wherein
the printing service apparatus has a Japanese character conversion program for converting character codes into characters, whereby
the printing service apparatus receives the characters input from the user terminal in the form of character codes, and converts the character codes into the characters to be used for generation of the composite image according to the Japanese character conversion program.

8. A method for providing a service of printing a composite image generated from an image and characters, said method comprising:
storing templates used for generating the composite image;
reading one of the stored templates according to a template transfer request received from a user terminal via a network;
sending the template from a printing service apparatus to the user terminal;
receiving characters input from the user terminal to be used for generating the composite image;
generating the composite image from the characters and the image according to the template, where the composite image so generated is the composite image used for printing;
generating composite image data representing the composite image and sending the composite image data to the user terminal, where the resolution of the composite image data is lower than that of the composite image;
sending, to the user terminal, data of an instruction page that enables the user terminal to specify enlargement of only the characters in the composite image; and
generating enlargement data representing the characters whose enlargement was specified by the user terminal and sending the enlargement data to the user terminal.

* * * * *